United States Patent Office 3,403,598
Patented Oct. 1, 1968

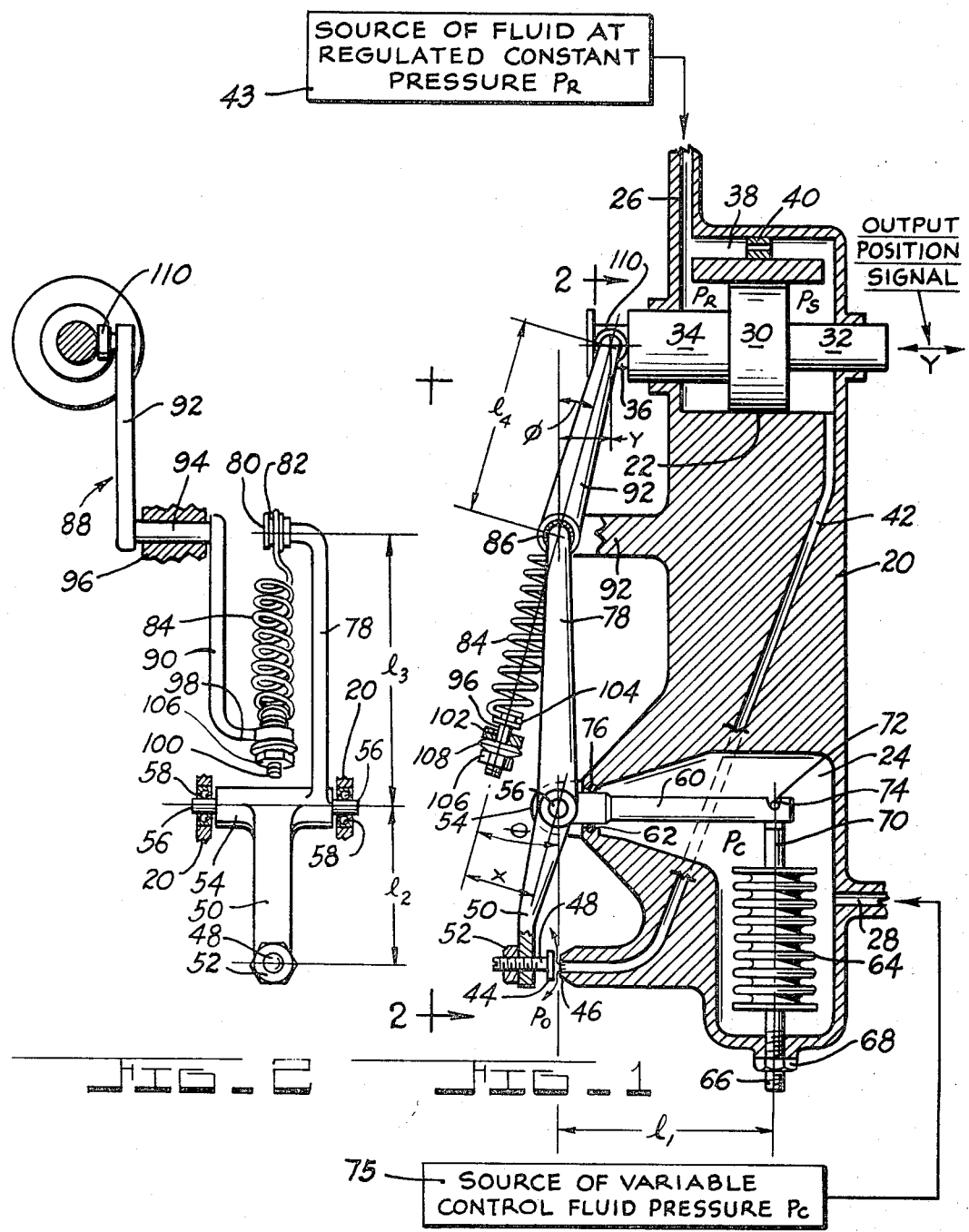

3,403,598
CONTROL APPARATUS HAVING VARIABLE EFFECTIVE LEVER RATIO FORCE BALANCE MECHANISM
Dale W. Franz and Milton R. Adams, South Bend, Ind., assignors to The Bendix Corporation, a corporation of Delaware
Filed May 16, 1966, Ser. No. 550,298
10 Claims. (Cl. 91—47)

ABSTRACT OF THE DISCLOSURE

Control mechanism of the force balance type wherein a variable force input acts through a lever to exercise control over a positionable output member which, in turn, is connected to the lever by a feedback spring which acts through a variable effective lever arm to generate a feedback torque in opposition to the input torque resulting from the force input.

---

The present invention is a simplified variation of the servo control apparatus described and claimed in U.S. Patent No. 3,232,179 issued Feb. 1, 1966, to H. L. Mc-Combs, Jr. (common assignee). The present invention performs with the advantages of the control apparatus disclosed in Patent No. 3,232,179 but is structurally simpler in that fewer levers are needed which, in turn, reduces the number of friction points at which close tolerance ball bearings are required, and the roller and associated close tolerance tables upon which the roller rides is eliminated.

In control apparatus such as servo systems and the like, it is sometimes desirable to maintain a linear relationship between an input force signal and the displacement of a movable member actuated in response to the input signal. Heretofore, such a relationship has been exceedingly difficult to establish and/or maintain in conventional servo systems wherein springs are utilized as part of the control network. The stretching or compressing of these springs has an undesirable effect on the spring rate of the springs and, in circumstances where the temperature of the springs varies with variation in an ambient temperature, additional complications which affect the spring rates are introduced into the system as will be recognized by those skilled in the art. Numerous attempts have been made to eliminate such undesirable effects on spring rates most of which feature complex compensating mechanisms that are not entirely accurate or reliable over the working range of the springs and, in addition, contribute to the size, weight and cost of the finished product. It is therefore one object of the present invention to provide means for maintaining a linear relationship between a variable input force and an output position signal.

It is another object of the present invention to provide simple and reliable force balance means capable of maintaining a linear relationship between an input force and an output mechanical position.

It is a further object of the present invention to provide a servo mechanism in which a variable input force is balanced by a constant reference force through variable ratio lever means over a wide range of values of the input force.

It is an important object of the present invention to provide a servo mechanism in which a variable input force is balanced by a constant reference force means through variable ratio lever means over a wide range of values of the input force which reference force is maintained constant irrespective of a variable environmental temperature affecting the force output thereof by temperature responsive means responsive to the environmental temperature and connected to the reference force means to compensate the same.

It is an important object of the present invention to provide a relatively simple, compact, reliable and accurate servo system having variable effective lever ratio force balance mechanism which operates to balance a variable input force by a constant reference force over a wide range of values of the input force.

It is another object of the preesnt invention to provide simple, reliable and accurate force balance mechanism for controlling an output member as a function of an input force signal.

Other objects and advantages of the present invention will become apparent to those persons skilled in the art in view of the following description taken in conjunction with the drawings wherein:

FIGURE 1 is a sectional view of a hydro-mechanical servo mechanism embodying the present invention; and FIGURE 2 is a view taken on line 2—2 of FIGURE 1 showing the force balance levers removed from the supporting casing.

Referring to the drawings, numeral 20 designates a casing having chambers 22 and 24 formed therein which are provided with fluid inlet passages 26 and 28, respectively. A servo piston 30 slidably carried in chamber 22 is provided with a cylindrical extension 32 extending from one side thereof through casing 20 into operative engagement with a member, not shown, to be positionably controlled. A second relatively larger diameter extension 34 extends from the opposite side of piston 30 through casing 20 and is provided with an annular groove 36 in the free end thereof. A branch passage 38 having a restriction 40 therein conducts fluid from inlet passage 26 to chamber 22 on the one side of piston 30 from which fluid passes via discharge passage 42 to a drain source at relatively low fluid pressure $P_o$. The inlet passage 26 communicates with a source of fluid at regulated constant pressure $P_R$ generally indicated by 43. The effective flow area of discharge passage 42 and thus the fluid pressure $P_s$ in chamber 22 downstream from restriction 40 is controlled by a movable valve member 44 which cooperates with a valve seat 46 provided at the discharge end of passage 42. The valve member 44 is provided with a threaded stem 48 threadedly secured to one end of a lever 50 and locked in position relative thereto by lock nut 52. The lever 50 is provided with a transverse portion 54 having integral end shafts 56 mounted on anti-friction bearing means such as ball bearings 58 suitably carried by casing 20 which provide a fixed pivot axis for the lever 50.

A circular arm or lever 60 integral to portion 54 extends through opening 62 in casing 20 into chamber 24. An evacuated bellows 64 is anchored at one end by means of a threaded stem 66 which extends therefrom into threaded engagement with casing 20 and locked in position relative thereto by lock nut 68. The opposite movable end of bellows 64 is provided with a stem 70 having a cross pin 72 which engages a complementary notch 74 in arm 60. The bellows 64 responds to a variable control fluid pressure $P_c$ supplied to chamber 24 via passage 28 from a source generally indicated by 75 which may be any desired control fluid pressure, as for example, the compressor discharge air pressure of a gas turbine engine in which event the output motion of piston 30 may control a fuel valve. The opening 62 is somewhat larger in diameter than is the arm 60 and is suitably recessed to carry a resilient annular seal such as "O" ring 76, or the like, which acts as a seal against pressure $P_c$ and which permits a limited range of movement of arm 60 in response to the load imposed thereon by bellows 64.

A lever 78 integral to transverse portion 54 extends therefrom with its free end bent to form a right angle extension which is provided with a spring retainer 80 having an annular recess 82 adapted to retain one end of a tension spring 84. The retaining member 80 may be rotatably mounted on anti-friction ball bearings 86 suitably secured to lever 78.

A lever 88 having oppositely extending substantially parallel arms 90 and 92 connected by a transverse shaft 94 is adapted to pivot about the axis of shaft 94 which is journaled in a support 96 defined by casing 20. The lever arm 90 is adapted to pivot in a plane parallel to the plane of movement of lever 78 and is provided with a flattened end portion 98 extending at a right angle therefrom. A retaining stem 100 slidably carried in an opening 102 in end portion 98 is provided with a circular recess 104 which retains a coiled end of tension spring 84. The stem 100 is threaded to receive a nut 106 which bears against a temperature responsive disc 108 interposed between the nut 106 and end portion 98. The lever arm 92 is provided with a roller 110, or the like, rotatably carried on the free end thereof which roller 110 is retained by annular groove 36 thereby causing lever 88 to pivot in response to movement of servo piston 30.

Operation

It will be assumed initially that the apparatus is in a balanced condition whereby the various elements are positioned as shown in FIGURES 1 and 2. Now, assuming an increase in the control fluid pressure $P_c$ transmitted to chamber 24, the bellows 64 responds accordingly increasing the force loading on arm 60 which together with transverse portion 54 and integral levers 50 and 78 pivots clockwise as viewed in FIGURE 1 thereby lifting valve 44 away from seat 46. The resulting increase in effective flow area of discharge passage 42 produces a decrease in pressure $P_s$ downstream from restriction 40 whereupon the piston 30 is actuated to the right as viewed in FIGURE 1 in response to the force unbalance acting thereon. The lever 88 follows piston 30 and pivots clockwise accordingly thereby increasing the angle $\theta$ between a line passing through the axis of bearings 58 and 86 and a line passing through the axis of bearing 86 and roller 110 as indicated in FIGURE 1. The effective lever arm length, $x$, of lever 78 through which the spring 84 acts is a function of the variable angle $\theta$ as represented by the equation $X = l_3 \sin \theta$ wherein $l_3$ is the length of lever 78 as measured from its pivot axis at one end to the axis of bearing 86 which passes through the effective force application point of spring 84 and $\theta$ is the angle spring 84 makes with the lever 78 as represented by a line passing through the axis of bearings 58 and 86 at opposite ends of lever 78.

The increase in effective lever arm length, $x$, of lever 78 results in an increase in torque in opposition to the torque generated by bellows 64 acting through arm 60 and tends to urge valve 44 toward the seat 46 to a null position which, in turn, causes an increase in fluid pressure $P_s$ downstream from restriction 40 thereby arresting movement of piston 30 and stabilizing the same. The travel of piston 30 relative to the input pressure $P_c$ may be made linear or non-linear depending upon the relationship of angles $\theta$ and $\phi$ made by the spring 84 and lever arm 92, respectively, with the lever 78. The piston travel is related to the input pressure $P_c$ in accordance with the relationship $Y = l_4 l_1 A_{64} P_c / l_3 F_s$ wherein $l_1$ is the effective length of arm 60, $l_4$ is the effective length of lever 92, $A_{64}$ is the effective end area of bellows 64, $P_c$ is the input fluid pressure to chamber 24 to which bellows 64 responds, $F_s$ is the spring 84 load which is a constant. For a balanced condition of valve 44 and thus piston 30, the opposing torques derived from bellows 64 and spring 84 are equal and may be set forth as $l_3 F_s \sin \theta = l_1 A_{64} P_c$. Thus, $\sin \theta = l_1 A_{64} P_c / l_3 F_3$. If the axes of lever 88 and bearing 86 are made to coincide as shown in the drawings, with angle $\phi$ equal to angle $\theta$ the travel, $Y$, of piston 30 may be represented by the relationship $$Y = l_4 \sin \phi = l_4 \sin \theta$$

Since $\sin \theta = l_1 A_{64} P_c / l_3 F_3$ substitution in the above equation $Y = l_4 \sin \theta$ results in the above-mentioned equation $Y = l_4 l_1 A_{64} P_c / l_3 F_3$. The terms $l_4 l_1 A_{64} / l_3 F_3$ are constant and may be characterized by a constant, C, which results in $Y = CP_c$ thereby establishing a linear relationship between piston travel, Y, and variable input pressure $P_c$.

A non-linear relationship between piston travel, Y, and input pressure, $P_c$, may be established by either suitable variation of the levers 92 and 90 so that the angle $\theta$ does not equal the angle $\phi$ in which case the spring 84 will have constant length, or by varying the length, $l_3$, of lever 78 so that the axes of bearing 86 and pivot axis of lever 88 do not coincide in which case the spring 84 will vary in length depending upon the position of piston 30.

The temperature responsive disc or discs 108 or any other suitable temperature element functions as a temperature compensation medium to maintain the spring 84 and at a constant value irrespective of temperature changes of the surrounding fluid. It will be recognized by those persons skilled in the art that the output force of tension spring 84 will tend to increase and decrease with a decrease and increase, respectively, in temperature thereof in response to variations in temperature of the surrounding fluid. The disc 108 is selected to expand in response to an increase in the surrounding fluid thereby urging nut 106 away from end portion 98 causing stem 96 to slide relative to end portion 98 thereby increasing the spring 84 length, accordingly, to restore the output force of spring 84 to its original value. In the case of a decrease in temperature, the disc 108 contracts to cause a shortening of spring 84 to compensate for the temperature effect on spring 84 and maintain the output force of the latter constant.

It will be apparent to one skilled in the art that various modifications and changes in the form and relative arrangements of parts may be made to suit requirements of a particular system without departing from the scope of applicant's invention as defined by the following claims. The input force signal may be generated by the above-mentioned fluid pressure $P_c$ acting on bellows 64 or by any other suitable means such as a lever actuated spring, speed actuated centrifugal weights or the like.

We claim:
1. In control apparatus, the combination of:
positionable means for producing an output position signal;
input force producing means responsive to a variable condition of operation;
means operatively connected to said positionable means for actuating the same;
first lever means mounted for movement on a first pivot axis and operatively connected to said input force producing means and said last named actuating means for controlling said actuating means as a function of said input force;
second lever means mounted for movement on a second pivot axis and operatively connected to and actuated by said positionable means;
resilient force producing means having one end pivotally secured to said first lever means at a fixed point thereon and an opposite end secured to said second lever means for imposing a feedback force on said first lever means in opposition to said input force to thereby balance said first lever means;
said opposite end and thus said resilient means pivoting about said fixed point relative to the first pivot axis associated with said first lever means in response to movement of said second lever means; and
a variable effective lever arm of said first lever means defined by the position of said opposite end relative to the first pivot axis associated with said first lever means;
said resilient means acting through said variable effec- tive lever arm of said first lever means in opposition to said input force.

2. In control apparatus as claimed in claim 1 wherein:
said resilient force producing means includes a spring and temperature responsive means;
said spring and temperature responsive means having similar temperature responsive charactertistics and being operatively connected such that changes in the output force caused by variations is ambient temperature are compensated by said temperature responsive means.

3. In control apparatus as claimed in claim 1 wherein:
said resilient force producing means includes a spring having a substantially constant output force;
said first and second lever means being arranged such that the second pivot axis associated with said second lever means and said fixed point on said first lever means about which said one end of said spring pivots are collinear;
said spring having a substantially constant length irrespective of the arcuate position thereof relative to said first lever means in response to the position of said second lever means;
said spring acting through said variable effective lever arm to establish a linear relationship between the position of said positionable means and the input force derived from said variable condition of operation.

4. In control apparatus as claimed in claim 1 wherein:
said resilient force producing means includes a spring;
said first and second lever means being arranged such that the second pivot axis associated with said second lever means and said fixed point on said first lever means about which said one end of said spring pivots are non-collinear;
said spring varying in length depending upon the position of said opposite end thereof in response to movement of said second lever means;
said spring defining a variable force acting through said variable effective lever arm to establish a non-linear relationship between the position of said positionable means and the input force derived from said variable condition of operation.

5. In control apparatus as claimed in claim 1 wherein:
said means for actuating said positionable means includes a fluid pressure actuated piston;
valve means for controlling said fluid pressure;
said first lever means connected to actuate said valve means;
said second lever means connected to said fluid pressure actuated piston and pivotally actuated thereby;
said first lever means having a balanced condition in response to equal and opposite torques derived from said resilient force producing means acting through said variable effective lever arm in opposition to said input force acting through a constant effective lever arm.

6. In control apparatus as claimed in claim 1 wherein:
said first lever means is mounted for movement on a first fixed pivot axis;
said second lever means is mounted for movement on a second fixed pivot axis; and
said resilient force producing means is pivoted about said fixed point in a plane parallel to the plane of movement of said first lever means.

7. In control apparatus as claimed in claim 2 wherein:
said resilient force producing means includes a spring;
a spring retaining member slidably attached to said second lever means and connected to retain said opposite end of said resilient force producing means;
said temperature responsive means including a member which expands and contracts depending upon the relative change in said ambient temperature;
said temperature responsive member being connected to said second lever means and said spring retaining member to slidably position said spring retaining member relative to said second lever means and cause a corresponding change in length of said spring thereby maintaining the force output thereof at a constant value irrespective of variations in said ambient temperature.

8. In control apparatus as claimed in claim 1 wherein:
said first lever means is pivotally mounted on anti-friction bearing means and said one end of said resilient force producing means is pivotally secured at said fixed point on said first lever means by anti-friction bearing means.

9. In control apparatus as claimed in claim 1 wherein:
said resilient means includes a spring having a substantially constant output force.

10. In control apparatus as claimed in claim 1 wherein:
said resilient means is a tension spring.

References Cited

UNITED STATES PATENTS

| | | | |
|---|---|---|---|
| 2,408,685 | 10/1946 | Rosenberger | 91—386 |
| 2,827,020 | 3/1958 | Cook | 91—386 |
| 3,084,550 | 4/1963 | Bowditch | 91—47 |
| 3,131,601 | 5/1964 | Curran | 91—387 |
| 3,232,179 | 2/1966 | McCombs | 91—386 |

EDGAR W. GEOGHEGAN, *Primary Examiner.*

B. L. ADAMS, *Assistant Examiner.*